US008600657B2

(12) United States Patent
Saito et al.

(10) Patent No.: US 8,600,657 B2
(45) Date of Patent: Dec. 3, 2013

(54) VEHICLE CONTROL APPARATUS

(75) Inventors: Shinjiro Saito, Hitachinaka (JP);
Atsushi Yokoyama, Tokyo (JP);
Toshiharu Sugawara, Hitachinaka (JP);
Tatsuya Yoshida, Naka (JP); Akira Takahashi, Isehara (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 205 days.

(21) Appl. No.: 12/920,396

(22) PCT Filed: Jul. 28, 2009

(86) PCT No.: PCT/JP2009/063384
§ 371 (c)(1),
(2), (4) Date: Apr. 25, 2011

(87) PCT Pub. No.: WO2010/032556
PCT Pub. Date: Mar. 25, 2010

(65) Prior Publication Data
US 2011/0187515 A1 Aug. 4, 2011

(30) Foreign Application Priority Data

Sep. 19, 2008 (JP) ................. 2008-240160

(51) Int. Cl.
*G06G 7/78* (2006.01)
*G08G 1/16* (2006.01)

(52) U.S. Cl.
USPC .......................... 701/301; 701/41

(58) Field of Classification Search
USPC ............. 701/23, 28, 36, 41, 42, 48, 301; 700/215, 255
See application file for complete search history.

(56) References Cited

U.S. PATENT DOCUMENTS 6,057,754 A 5/2000 Kinoshita et al.
6,138,062 A * 10/2000 Usami ............................ 701/23
(Continued)

FOREIGN PATENT DOCUMENTS

JP 11-66494 A 3/1999
JP 11-142181 A 5/1999
(Continued)

OTHER PUBLICATIONS

JP Office Action dated Jan. 17, 2012 with English translation.
(Continued)

*Primary Examiner* — Fadey Jabr
*Assistant Examiner* — Thomas Ingram
(74) *Attorney, Agent, or Firm* — Crowell & Moring LLP

(57) ABSTRACT

According to conventional art, if there is an obstacle on the left of a vehicle, a control threshold value is set so as to avoid the obstacle. If the control threshold value is exceeded, the vehicle is controlled in accordance with a deviation quantity so as to return to a position where the control threshold avoids being exceeded. However, even if a risky oncoming vehicle is approaching the vehicle on the right, the vehicle is controllably moved toward the oncoming vehicle. Thus, disadvantageously, a driver has a sense of fear or discomfort. A vehicle control apparatus according to the present invention includes a calculation section configured to calculate a first risk level present on the left of the vehicle and a second risk level present on the right of the vehicle, a setting section configured to set a first control threshold for the left of the vehicle based on the first risk level and to set a second control threshold for the right of the vehicle based on the second risk level, a change section configured to change at least one of the first and second control thresholds based on the first and second risk levels, and a control section configured to control the vehicle based on the changed control threshold.

6 Claims, 7 Drawing Sheets

(56) References Cited

U.S. PATENT DOCUMENTS

| | | |
|---|---|---|
| 6,185,492 B1 * | 2/2001 | Kagawa et al. ............... 701/41 |
| 7,107,137 B2 * | 9/2006 | Tange et al. .................. 701/70 |
| 7,243,026 B2 * | 7/2007 | Kudo ............................ 701/301 |
| 7,765,066 B2 | 7/2010 | Braeuchle et al. |
| 8,494,675 B2 * | 7/2013 | Ichinose et al. ............. 700/245 |
| 2004/0030497 A1 * | 2/2004 | Knoop et al. ................. 701/301 |
| 2005/0134440 A1 * | 6/2005 | Breed ............................ 340/435 |
| 2005/0228588 A1 | 10/2005 | Braeuchle et al. |
| 2006/0106496 A1 * | 5/2006 | Okamoto ....................... 700/253 |
| 2006/0235598 A1 * | 10/2006 | Kudo ............................ 701/96 |
| 2007/0109111 A1 * | 5/2007 | Breed et al. .................. 340/435 |
| 2007/0208485 A1 | 9/2007 | Yamamura et al. |
| 2008/0172153 A1 * | 7/2008 | Ozaki et al. .................. 701/36 |
| 2009/0088966 A1 * | 4/2009 | Yokoyama et al. ........... 701/201 |
| 2009/0143986 A1 * | 6/2009 | Stein et al. ................... 701/301 |
| 2010/0030430 A1 * | 2/2010 | Hayakawa et al. ........... 701/42 |

FOREIGN PATENT DOCUMENTS

| | | |
|---|---|---|
| JP | 2004-199286 A | 7/2004 |
| JP | 2005-524135 A | 8/2005 |
| JP | 2005-324782 A | 11/2005 |
| JP | 2006-315491 A | 11/2006 |
| JP | 2006-321299 A | 11/2006 |
| JP | 2007-230440 A | 9/2007 |
| JP | 2009-78733 A | 4/2009 |
| WO | WO 03/091813 A1 | 11/2003 |

OTHER PUBLICATIONS

International Search Report dated Nov. 17, 2009 (three (3) pages).

* cited by examiner (A)

(B)

(A)

(B)

VEHICLE CONTROL APPARATUS

TECHNICAL FIELD

The present invention relates to a vehicle control apparatus configured to support driving in which a driver is prevented from having a sense of discomfort.

BACKGROUND ART

If a vehicle is likely to deviate from the correct driving lane, a conventional vehicle control apparatus applies a yaw moment to the vehicle to prevent the vehicle from deviating from the driving lane or warns the driver that the vehicle is likely to deviate from the driving lane (see Patent Document 1). The vehicle control apparatus can perform lane deviation avoidance control by changing the control quantity of lane deviation avoidance control, for example, a threshold for deviation avoidance control, depending on an obstacle (a parked vehicle or the like) on the road shoulder.

Patent Document 1: JP Patent Publication (Kokai) No. 2005-324782

DISCLOSURE OF THE INVENTION

Problems to be Solved by the Invention

According to Patent Document 1, if there is a parked vehicle ahead of the vehicle on the left, the control threshold is set so as to avoid the parked vehicle. The vehicle is controlled such that if the control threshold is exceeded, the vehicle is returned to a position where the control threshold is prevented from being exceeded, in accordance with the deviation amount. However, if a risky obstacle (an oncoming vehicle or the like) is approaching the vehicle on the right, the vehicle is controllably moved toward the oncoming vehicle, disadvantageously providing the driver with a sense of fear or discomfort.

Thus, an object of the present invention is to provide a vehicle control apparatus configured to safely and controllably prevent the driver from having a sense of discomfort during driving even if there are risks ahead of the vehicle on both sides.

Means for Solving the Problems

To accomplish the above-described object, the present invention provides a desirable aspect as follows.

A vehicle control apparatus includes a calculation section configured to calculate a first risk level present on a left of a vehicle and a second risk level present on a right of the vehicle, a setting section configured to set a first control threshold for the left of the vehicle based on the first risk level and to set a second control threshold for the right of the vehicle based on the second risk level, a change section configured to change at least one of the first and second control thresholds based on the first and second risk levels, and a control section configured to control the vehicle based on the changed control threshold.

Advantage of the Invention

The present invention can provide a vehicle control apparatus configured to controllably allow the vehicle to travel safely while preventing the driver from having a sense of discomfort even if there are risks ahead of the vehicle on both sides.

DESCRIPTION OF SYMBOLS

1 . . . controller, 2 . . . steering angle sensor, 3 . . . direction indicator lever, 4 . . . accelerator pedal operation quantity sensor, 5 . . . brake pedal operation quantity sensor, 6 . . . navigation apparatus, 7 . . . wheel speed sensor, 8 . . . vehicle behavior sensor, 10 . . . camera, 11 . . . radar, 21 . . . engine, 22 . . . electronic control brake, 23 . . . electronic control differential mechanism, 24 . . . electronic control steering mechanism, 25 . . . information provision section

BEST MODE FOR CARRYING OUT THE INVENTION

Embodiments will be described below with reference to the drawings.

Embodiment 1

Figure 1:
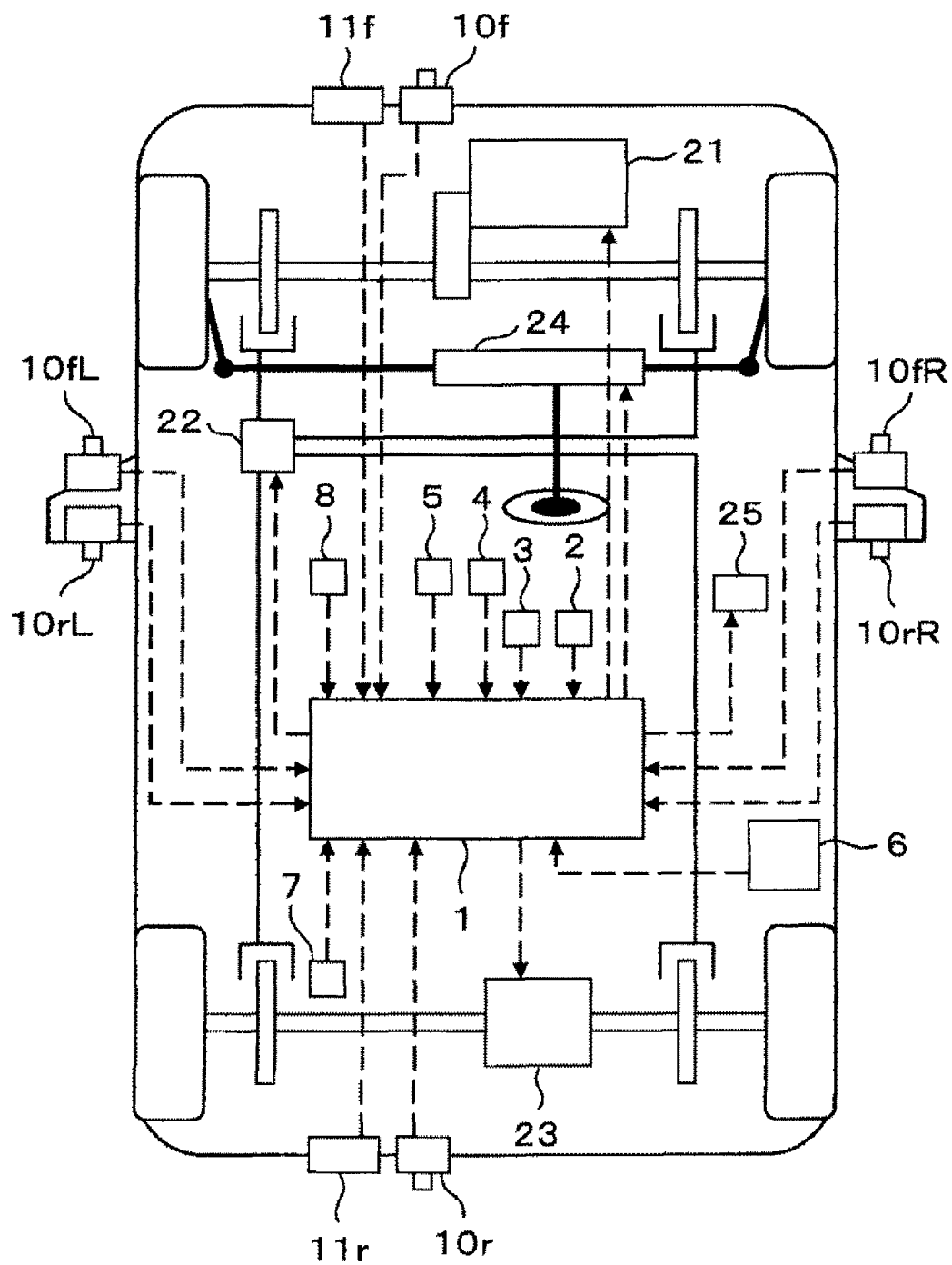
FIG. 1 A diagram showing the configuration of a vehicle in which a vehicle control apparatus is mounted.

FIG. 1 is a diagram showing the configuration of a vehicle in which a vehicle control apparatus is mounted.

The vehicle includes a controller 1 configured to control the vehicle, an operation quantity detection section (steering angle sensor 2, direction indicator lever 3, accelerator pedal operation quantity sensor 4, and brake pedal operation quantity sensor 5) configured to detect various operation quantities provided by a driver, a navigation apparatus (hereinafter simply referred to as the navigation) 6, a motion state detection section (wheel speed sensor 7 and wheel behavior sensor 8) configured to detect the motion state of the vehicle, an environment recognition section (camera 10 (front camera 10f, rear camera 10r, left front camera 10fL, right front camera 10fR, rear left camera 10rL, and rear right camera 10rR)) configured to recognize an external environment around the vehicle, a radar 11 (front radar 11f and rear radar 11r), an actuator (engine 21, electronic control brake 22, electronic control differential mechanism 23, and electronic control steering mechanism 24), and an information provision section 25 configured to provide the driver with information.

The controller 1 is connected to the navigation 6 to acquire a set route, map information, the position and direction of the vehicle on the map, and surrounding lane information (the number of lanes, a speed limit, the difference between a freeway and a general road, the presence or absence of a fork road, the shape of a curve, weather, time, and the like). The route may be set by the driver or set (changed) by the navigation 6 based on past driving routes and traffic information.

The operation quantity detection section transmits a signal corresponding to the operation quantity provided by the driver, to the controller 1. The driver's intension to change the route can be detected in the operation of the direction indicator lever 3. Here, the operation quantities provided by the driver refer to signals corresponding to the steering angle, the state of the direction indicator, the operation quantity of the accelerator pedal, the operation quantity of the brake pedal, and the set route.

The motion state detection section transmits the motion state amount of the vehicle to the controller 1. Here, the motion state amount refers to a vehicle speed, a yaw rate, a lateral acceleration, a front-rear acceleration, a lateral jerk, and a front-back jerk.

The environment recognition section transmits information on lane markers and obstacles around the vehicle to the controller 1. Here, the lane markers include lanes (solid line, dashed line, dotted line, and hatching), botts dots, and cats eyes.

The camera 10 includes an image acquisition section configured to acquire images of surroundings of the vehicle, and a lane recognition section configured to recognize the images acquired. The camera 10 outputs state quantities such as the type, acceleration, luminance, color, width, and height of an obstacle or the relative distance and speed between the vehicle and the obstacle. The radar 11 also outputs state quantities such as the relative position and speed between the vehicle and the object. Here, examples of the obstacle include stationary obstacles such as a road shoulder, a guard rail, a fallen object, a riverbank, a roadside ditch, a median strip, a road sign, a tree, a telephone pole, a house, a wall, curbstone, and a parked vehicle, and mobile obstacles such as another vehicle (a bus, a truck, a traction vehicle, or a crane vehicle), a pedestrian, a bicycle, and a motorbike.

The rear radar 11*r* is characterized by being capable of recognizing a farther obstacle than the rear camera 10*r*. On the other hand, the rear camera 10*r* is characterized by having a wider detection angle and being capable of identifying the obstacle over a wider angle than the rear radar 11*r*.

The controller 1 makes a driving request to the actuator based on the driver's operation quantity and external environment. Furthermore, the controller 1 makes an acceleration request to the engine 21 if the vehicle needs to be accelerated, and makes a deceleration request to the electronic control brake 22 when the vehicle needs to be decelerated. Moreover, if the vehicle needs to be turned, the controller 1 outputs a turning request to at least one of the electronic control brake 22, the electronic control differential mechanism 23, and the electronic control steering mechanism 24.

The electronic control brake 22 is, for example, a hydraulic brake apparatus capable of independently controlling a braking force applied to each wheel. Upon receiving a turning request, the electronic control brake 22 puts a brake on one of the right and left wheels to apply a yaw moment to the wheels.

The electronic control differential mechanism 23 is, for example, a mechanism capable of driving an electric motor or a clutch to cause a torque difference between the right and left axles. Upon receiving a turning request, the electronic control differential mechanism 23 causes a torque difference between the right and left axles to apply a yaw moment to the vehicle.

The electronic control steering mechanism 24 is, for example, a steer-by-wire mechanism. Upon receiving a turning request, the electronic control steering mechanism 24 corrects the actual rudder angle of the wheel independently of the steering wheel to apply a yaw moment to the vehicle.

The information provision section 25 (a monitor apparatus with a built-in speaker or the like) provides support information by image display or sound or with a warning lamp depending on the type of driving support. The information provision section 25 may be installed at a plurality of positions instead of only one position.

Figure 2:
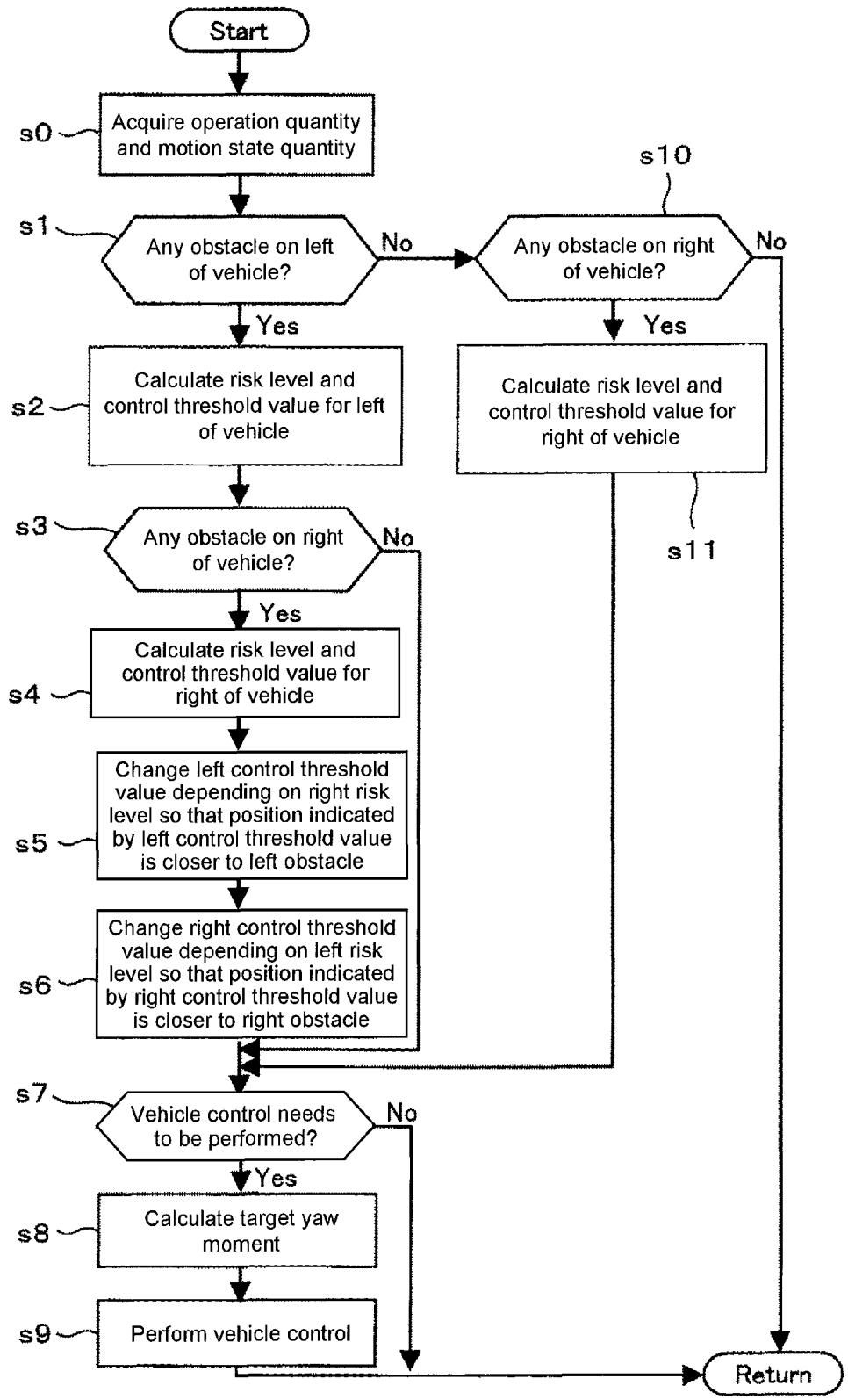
FIG. 2 A flowchart of the vehicle control apparatus.
Figure 3:
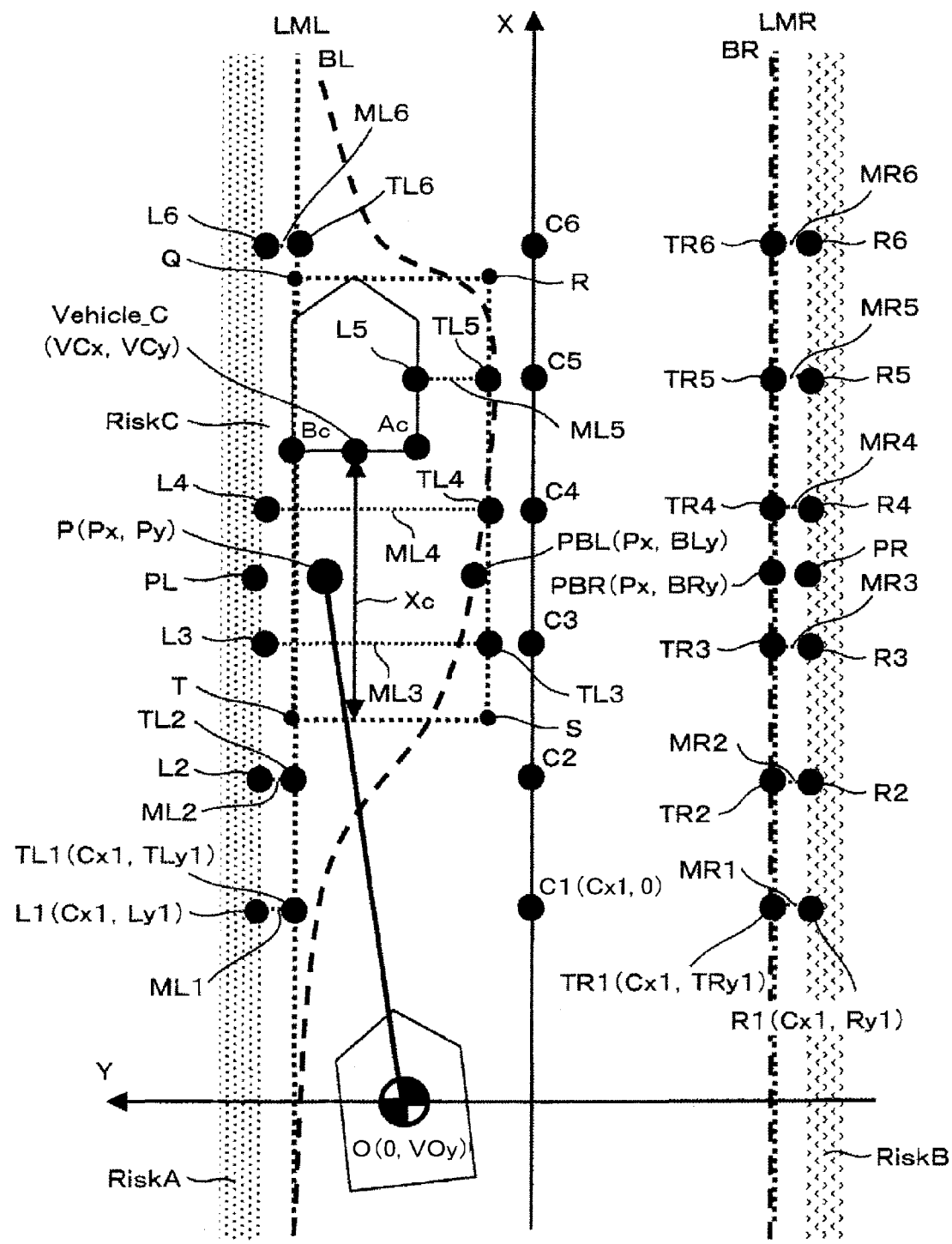
FIG. 3 A diagram showing a control method to which the present embodiment has not been applied yet.
Figure 4:
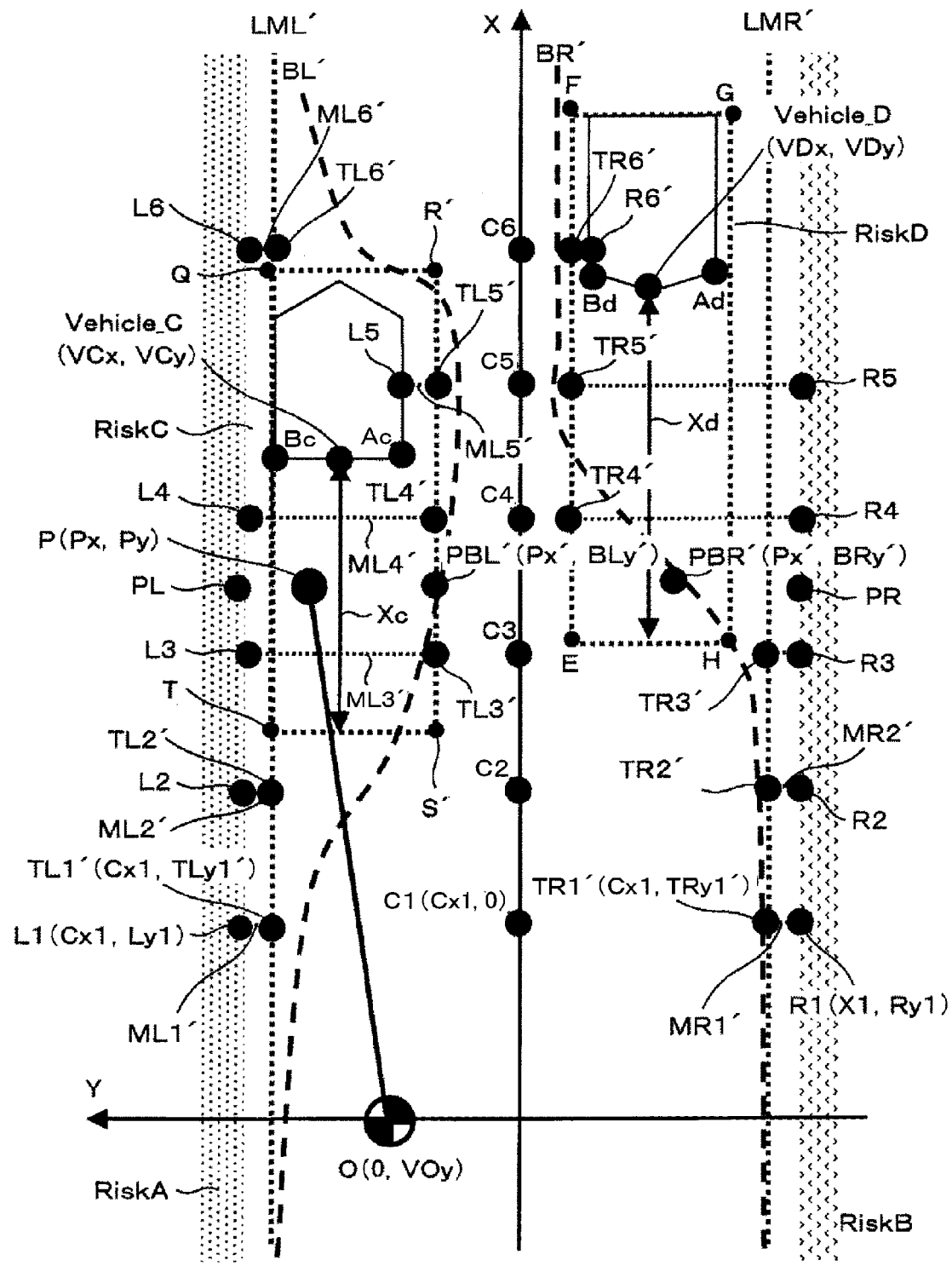
FIG. 4 A diagram showing a control method to which the present embodiment has been applied.

Now, with reference to FIGS. 2 to 4, an embodiment will be described in which while traveling on a straight road, a vehicle detects an oncoming vehicle B approaching the vehicle from ahead on the right and detects a parked vehicle C ahead of the vehicle on the left. FIG. 2 is a flowchart of the controller 1, configured to perform driving support control. FIG. 3 is a diagram showing that the present embodiment is applied to the case in which there is a parked vehicle ahead of the traveling vehicle on the left. FIG. 4 shows that that the present embodiment is applied to the case in which there is an oncoming vehicle approaching the vehicle from ahead on the right.

As shown in FIG. 3, the lateral road ends are sensed, and a coordinate system is set such that the center between the ends is defined as an X axis and such that the position of center of gravity of the vehicle is defined as O (0, VOy). In this case, the point where the center of gravity of the vehicle arrives tp seconds after the current time (t=0) is called a front point of interest P. The coordinates of P are denoted by (Px, Py). If the lateral acceleration of the vehicle is ay, then $Py=ay \times \Delta tp^2/2$. Here, ay may be determined using a yaw rate (r) detected by the vehicle behavior sensor 8, that is, $ay=Vx \times r$ or may be determined to be $ay=Vx \times f(\delta)$ if the steering angle is $\delta$. $f(\delta)$ is a function that allows $\delta$ and (r) to be determined and can be derived using a vehicle motion model. ay may be determined based on an accurate analysis formula instead of using the above-described techniques.

In FIG. 2, the controller 1 acquires the operation quantity provided by the driver from the operation quantity detection section and acquires the motion state quantity of the vehicle from the motion state detection section (s0).

Then, based on the results of detection by the front camera 10*f*, the left front camera 10*f*L, or the front radar 11*f*, the controller 1 determines whether or not there is any obstacle on the left of the vehicle (s1). Upon determining that there is an obstacle, the controller calculates the left risk level (S2).

Here, segments C1 (Cx1, 0) to C6 (Cx6, 0) are set on the X axis. The segments are internal information on the camera 10. The intervals between the segments are normally set to several mm. Point L1 (X1, Ly1) to point L6 (X6, Ly6) are each a reference point positioned on the left of the vehicle with respect to a straight line passing through points C1 to C6 and which is parallel to the (y) axis and an object extracted by the camera.

The risk level Risk* is an evaluation function that numerically indicates the state of the object *. For example, in FIG. 3, RiskA denotes the state value of the road boundary on the left of the vehicle. RiskA denotes the state value of a road boundary on the left of the vehicle. RiskB denotes the state value of the road boundary on the right of the vehicle. RiskC denotes the state value of the obstacle (parked vehicle) on the left of the vehicle. RiskD denotes the state value of the obstacle (oncoming vehicle) on the right of the vehicle. Depending on the risk levels Risk*, control intervention threshold values (TL* for the left and TR* for the right) are set at positions located at predetermined distances (ML* for the left and MR* for the right) from a lane marker or the obstacle. Basically, the control intervention value is expressed by TLy*=Ly*−ML*. Here, ML* varies depending on the corresponding Risk*. In FIG. 3, ML1 and ML2 are known to be the road ends at RiskA, for example, ML1=ML2=kn×RiskA is set and the control intervention thresholds TL1 and TL2 are set for points located at predetermined distances from the road ends. Furthermore, for TL3 and TL4, if the reference points L3 and L4 are within a predetermined front-back distance Xc calculated based on the RiskC of the parked vehicle Vehicle_C located ahead on the left (for example, Cx3>VCx−

Xc, Cx4>VCx−Xc), then ML3=ML4=kv×RiskC is set, and TLy3=L3y−ML3 and TLy4=L4y−ML4 are determined. Additionally, for the control intervention threshold value TL5, the position referenced by the camera is L5. Thus, TL5 is similarly determined based on ML5 calculated from RiskC. For TL6, the reference point may fail to be calculated at the segment C6. Thus, the reference point L6 is calculated based on the road width over which the vehicle has traveled. In this case, the Risk fails to be specified (the camera fails to recognize the object). Hence, a value may be pre-stored which is to be used when the Risk fails to be specified.

Here, it is assumed that if the rear lamps of the vehicle appearing to be the parked vehicle Vehicle_C are not lighted and the vehicle shows no sign of moving, then the controller 1 can determine that the vehicle is completely stopped. For example, the RiskC can be calculated using:

RiskC=K_lamp (the lighting state (luminance) of the brake lamp)+K_winker (the lighting state of the direction indicator)+K_tire (the direction of the front wheels of the parked vehicle)

Alternatively, it is possible to preset and store risk levels for the respective types of obstacles as a table instead of using the above-described expression. Alternatively, the obstacle may be classified based on the state quantities (luminance, color, width, height, and the like) and shape of the obstacle. A predetermined Risk and a predetermined distance may be set for each type of obstacle so as to be changed based on the shape of the road on which the vehicle is traveling, the weather, and the like. This classification is set with the driver's psychological sense of fear taken into account.

Alternatively, based on the estimated state quantities of the obstacle, the distribution of probabilities at which the obstacle collides against the vehicle may be calculated so as to allow the risk level to be calculated based on the probability. For example, if the oncoming vehicle D is detected on the right of the vehicle, the relative speed, the relative acceleration, and the relative position are detected using the front camera 10f, the front radar 11f, and the like. The steering angle, yaw rate, speed, acceleration, and the like of the vehicle are then calculated. Then, based on these values, the yaw rate and steering angle of the oncoming vehicle D are calculated. Alternatively, a front curve may be detected using the navigation 6 and the turning radius of the curve may be calculated so as to allow the steering angle, yaw rate, lateral acceleration, and the like of the oncoming vehicle D to be calculated. The width or height of the oncoming vehicle D may be added to the above-described pieces of information to allow the Risk and predetermined distance to be calculated.

Moreover, shaking of the mobile obstacle may be taken into account. For example, the driver tends to feel like avoiding approaching too close to the mobile object, so that the predetermined distance may be set to a large value. Alternatively, information on the weather and time may be acquired from the navigation 6 so that the predetermined distance may be set to a large value when a driving situation such as snow, rain, or nighttime is sensed.

The control may be intended for the road shape (curve, straight line, intersection, fork road, ramp, junction, or the like) as described below, instead of the object.

Then, the points of the control intervention threshold values TL1 to TL6 are interpolated to obtain a curve BL.

Here, when Py>BLy at the front point of interest P (Px, Py), the vehicle (the center of gravity) may cross the corresponding boundary and travel in a dangerous area unless certain control is performed on the vehicle or the driver appropriately operates the vehicle by tp seconds later. Thus, the apparatus sets the BLy to be a threshold value at which left control intervenes in the vehicle, and proceeds to s3.

Then, based on the results of detection by the front camera 10f, the right front camera 10fR, the front radar 11f, or the like, the controller determines whether or not there is any obstacle on the right of the vehicle (s3). Upon determining that there is an obstacle, the apparatus calculates the right risk level (s4). If there is no obstacle, the apparatus proceeds to s7.

Point R1 to R6 are reference points for the object extracted by the camera; the points R1 to R6 are positioned on straight lines passing through points C1 to C6, respectively, and which are parallel to the (y) axis and on the right of the vehicle. Based on these points, the control intervention value for each segment is then calculated. For example, for C1, the point corresponding to Ry1+MR1 is calculated, and for C2, the point corresponding to Ry2+MR2 is calculated. These points are interpolated to obtain a curve BR.

As is the case with the threshold value at which the left control intervenes in, when Py>BRy at the front point of interest P (Px, Py), the vehicle (the center of gravity) may cross the corresponding boundary and travel in a dangerous area unless certain control is performed on the vehicle or the driver appropriately operates the vehicle by tp seconds later. Thus, the apparatus sets the BRy to be a threshold value at which right control intervenes in the vehicle, and proceeds to s5.

The interpolated curves BL and BR are, for example, straight lines, spline curves, linear variations delayed by a primary filter, or the like.

s5 and s6 will be described with reference to FIG. 4.

In s5, a left virtual lane is modified in accordance with the right risk level. The control intervention threshold value TL* calculated in s2 is changed based on the risk level RiskD calculated in s4. First, the RiskD is calculated as follows.

RiskD=K_VVd (the speed of the oncoming vehicle D)+K_dY (the relative lateral position (VOy−VDy) with respect to the vehicle)+K_W (the width (Bd−And) of the oncoming vehicle D)

Thus, ML1'=ML2'=km×RiskA−kn×RiskD is set so as to decrease by a predetermined value depending on the RiskD. The control intervention threshold values are TLy1'=Ly1−ML1' and TLy2'=Ly2−ML2' and are similarly calculated up to TLy6'. These control intervention threshold values are interpolated to calculate an interpolated curve BL' corrected in accordance with the RiskD. Thus, the control intervention threshold value on the BL' with the X coordinate Px' is BLy'.

Furthermore, the right control intervention threshold value corresponding to the RiskD is calculated in the same manner as that described above. The control intervention threshold value for the right of the vehicle is BRy'.

As described above, based on the RiskD of the oncoming vehicle, the control intervention threshold value for the left of the vehicle is changed to be closer to the RiskC to make the control intervention more difficult than before the change.

Here, the ML* and MR* set in accordance with each obstacle are determined with the avoidance capability of the vehicle taken into account. Thus, it is possible to generate, as an argument, at least one of the front-back speed Vx, lateral speed Vy, control threshold value approach speed Vya, front-back acceleration ax, lateral acceleration ay, width vw, overall length vl, tread width (d), and wheel base L of the vehicle, the yaw moment generation capability Mmax of the vehicle, the deceleration generation capability axmax of the vehicle, the lateral acceleration generation capability aymax of the vehicle, a road surface friction coefficient μ, a road surface gradient θ, a curve radius R, the distance and angle at which the lane can be detected, and the distance and angle at which the obstacle can be detected.

When the maximum value of the yaw moment that can be generated by the actuator is Mmax, the maximum lateral acceleration is set to be as G times as large as that of the yaw moment for calculation (aymax=G×Mmax). When the vehicle moves laterally at the maximum lateral acceleration aymax starting from the state where the vehicle approaches the position of the contact avoidance line at a lateral speed of Vya, the distance ΔYmax from a point corresponding to an approach speed of Vya to a point corresponding to an approach speed of zero is determined to be ΔYmax=Vya$^2$/(2×aymax). To avoid contact with the obstacle, My>ΔYmax is set. On the other hand, to accept a certain degree of contact but reduce possible damage resulting from the contact, My≤ΔYmax is set.

Then, the apparatus determines whether or not vehicle control needs to be performed (s7). If the front point of interest P is positioned between the left control intervention threshold value BLy' (if not changed, BLy) and the right control intervention threshold value BRy' (if not changed, BRy), the apparatus finishes a series of processes. If the front point of interest P is not positioned between the left control intervention threshold value BLy' and the right control intervention threshold value BRy', the apparatus proceeds to s8.

In s8, a target yaw moment is calculated so as to return the vehicle to between the left control threshold value BLy' (if not changed, BLy) and the right control intervention threshold value BRy' (if not changed, BRy).

In s9, the control section controls the vehicle based on the changed control threshold values. Specifically, means for realizing the target yaw moment is selected depending on the situation. For example, to alleviate the driver's sense of discomfort, it is possible to generate a yaw moment using the electronic control differential mechanism 23 and the electronic control steering mechanism 24 instead of using the electronic control brake 22 to decelerate the vehicle.

If the front point of interest exceeds the control intervention value BL, the electronic control steering mechanism is used to operate the steering to generate a yaw moment, and the threshold value is changed from BL to BL' in accordance with the RiskC. Thereafter, if the BL' is exceeded, not only the electronic control steering mechanism performs a yaw moment operation but a brake is applied only to the right wheel of the vehicle for deceleration to exert a synergetic effect on safety.

Figure 5:
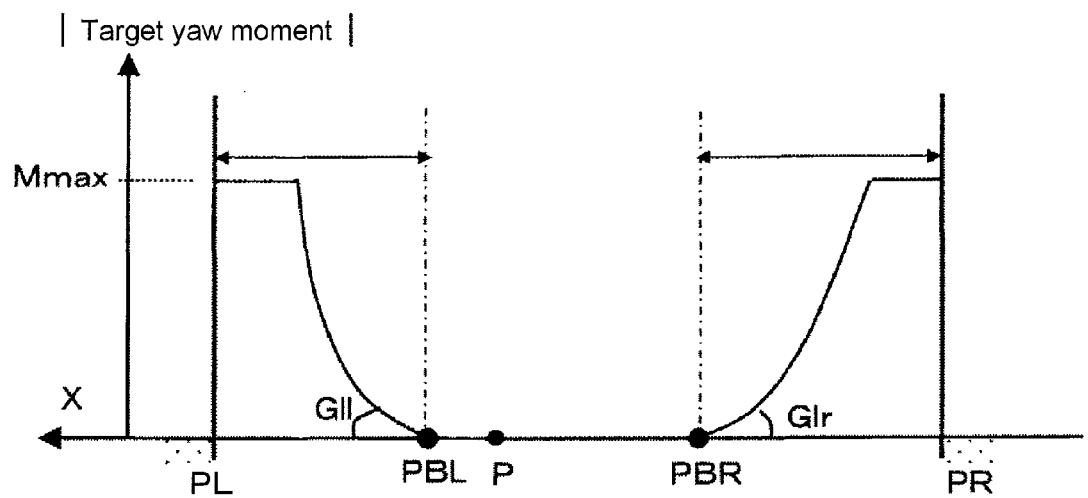
FIG. 5 A diagram showing the control quantity of the vehicle control apparatus.
Figure 5:
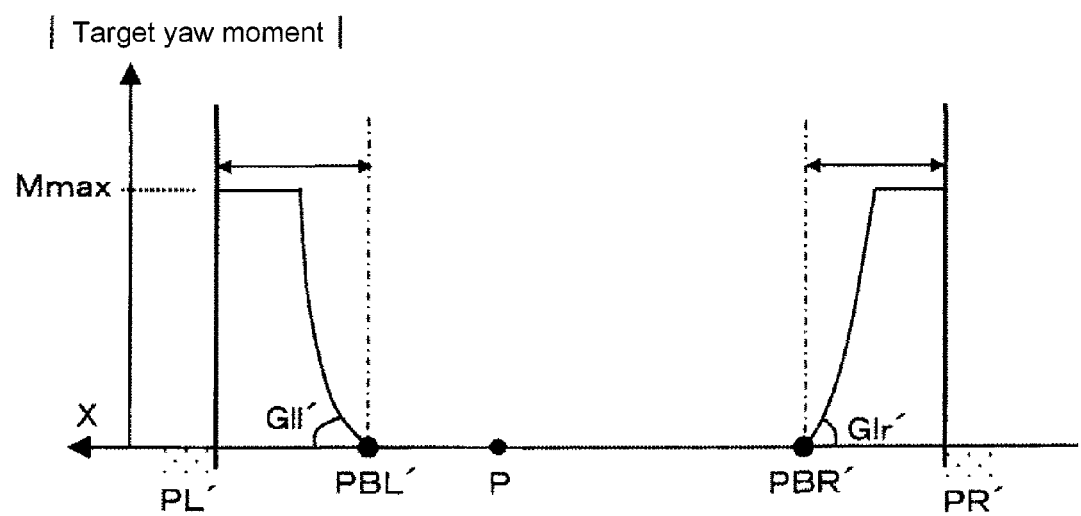

FIG. 5 is a diagram showing the control quantity provided by the vehicle control apparatus.

FIG. 5(A) shows the positional relationship between the front point of interest P and the left road end PL and the right road end PR, the left control threshold value PBL, and the right control threshold value PBR, as well as the absolute value of the target yaw moment. FIG. 5(A) corresponds to the conventional art, which fails to take the right and left risk levels into account. On the other hand, FIG. 5(B) shows the positional relationship between the front point of interest P and the left road end PL' and the right road end PR', the left control threshold value PBL', and the right control threshold value PBR', as well as the absolute value of the target yaw moment. FIG. 5(B) corresponds to the present embodiment, which takes the right and left risk levels into account.

As described above, the increase gradients Gll and Glr of the yaw moment are gradually varied to smoothly generate yaw motion, thus enabling implementation of vehicle control hindering the driver from having a sense of discomfort. Furthermore, the increase gradient is increased (from Gll to Gll') with decreasing distance to the road end, thus increasing an area in which the limit capability (Mmax) of the vehicle is generated. Thus, the ranges from the PL and PR can be increased (PL' and PR'). That is, the predetermined distance ML* from the left road end is changed to ML*' in accordance with the risk level RiskD of the oncoming vehicle D (ML*>ML*'). The predetermined distance MR* from the right road end is changed to MR*' in accordance with the risk level RiskC of the parked vehicle Vehicle C (MR*>MR*'). The distance between the PL' and the PR' is thus increased. This makes the control intervention difficult to reduce the driver's burden. Moreover, in this case, if the front point of interest exceeds the control intervention threshold value, since the increase gradient Gll' is larger than the increase gradient Gll, the control quantity is increased even though the quantity of deviation from the control intervention threshold value unchanged.

Then, the vehicle control is performed (s9). To achieve the target yaw moment and the target deceleration, the vehicle is controlled using at least one of the electronic control differential mechanism 23, the electronic control steering mechanism 24, and the electronic control brake 22. A warning sound, a warning, a monitor display, or the like in the information provision section 25 may be used to urge the driver to change the operation.

Figure 6:
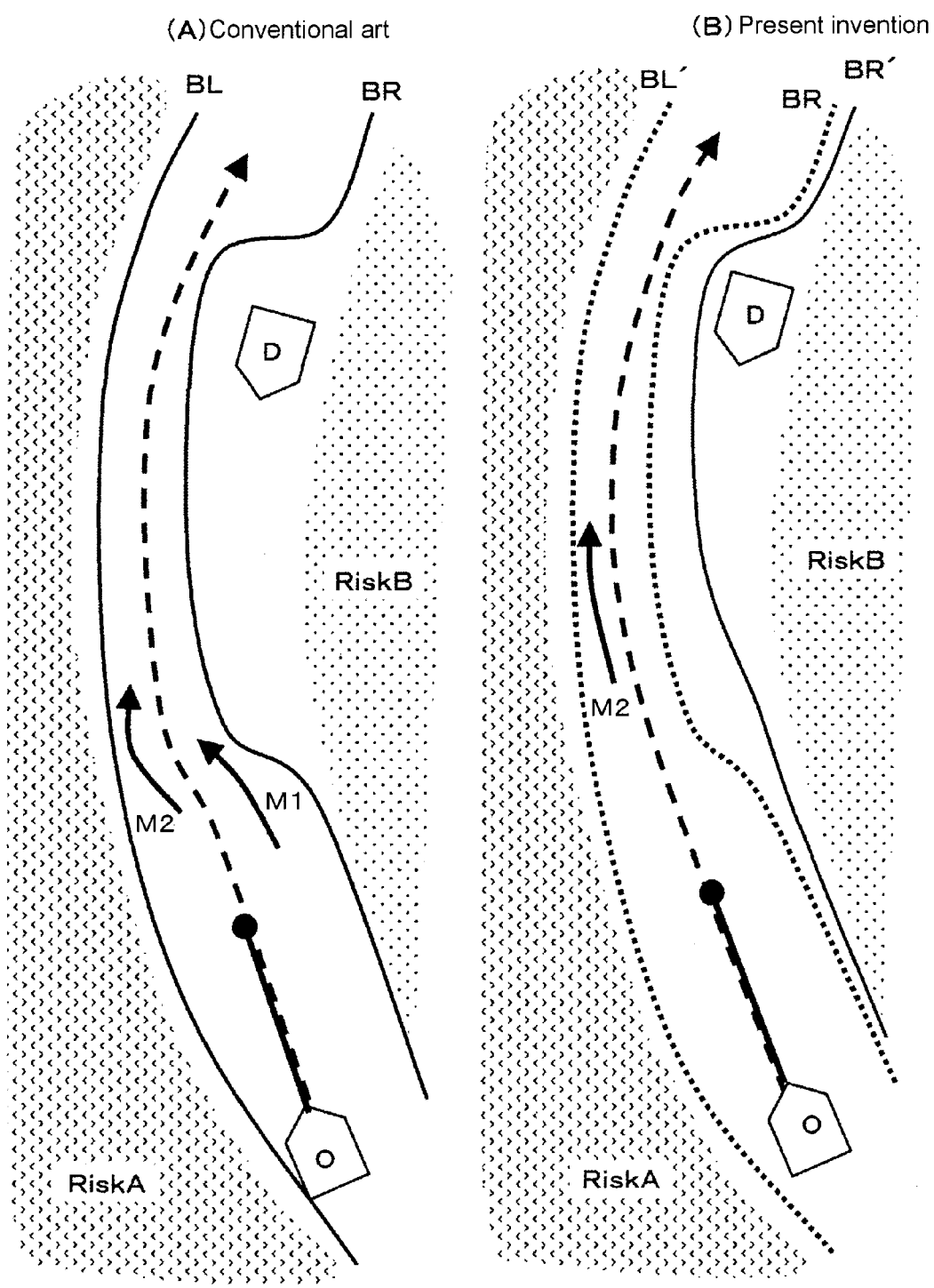
FIG. 6 A diagram showing vehicle control at a curve.

FIG. 6 is a diagram showing vehicle control for a curve. FIG. 6(A) shows the conventional art, and FIG. 6(B) shows the present embodiment.

In the conventional art, the curve BL of the control intervention threshold value is set in accordance with the risk level RiskA for the left of the vehicle. Furthermore, if the oncoming vehicle D approaches the vehicle from ahead on the right, the curve of the control intervention threshold value is set as shown by BR in accordance with the RiskD of the oncoming vehicle. A yaw moment is applied to the vehicle so as to position the vehicle between the BL and the BR. The vehicle is thus controlled so as to move away from the risk.

In general, a turning vehicle is likely to shift outward in the turning direction. A strong tire force needs to be generated in order to conversely shift the vehicle inward in the turning direction. Here, when the driver further turns the steering wheel or exerts a force on the vehicle in a direction opposite to that in which the vehicle is turned (a moment M in FIG. 6), the vehicle itself may become unstable or the driver may have a sense of anxiety. On the other hand, if the threshold BL for the turning outward direction is exceeded and the vehicle is controlled so as to travel inward in the turning direction, then in connection with the characteristics of the vehicle observed during turning, the driver is prevented from having a sense of discomfort or fear.

In view of the above description, the present embodiment takes the following into account: the RiskA and the RiskD have been sensed on the respective opposite sides of the vehicle, and the vehicle is traveling around a curve. That is, the BR is set to BR' that is positioned more inward in the turning direction, and the BL is set to BL' that is a position almost the same as that of the BL, because the vehicle is traveling around a curve. Thus, the BR is unlikely to be crossed over, thus reducing the frequency of control interventions that apply a moment in the direction opposite to the turning direction. On the other hand, even if the vehicle deviates from the lane toward the BL, a moment is applied in the direction in which the vehicle can be more easily turned, preventing the driver from having a sense of discomfort.

In the above-described embodiment, the straight road and the curve as road shapes have been described. However, the present invention is also applicable to various driving scenes such as a road shape involving a certain risk level, a junction, and an intersection. Furthermore, a higher risk level may be set for obstacles that are infrequently seen on highways, for example, a dump truck, a trailer, a crane vehicle, a snow plow, and a special vehicle, which are elements providing the driver with a sense of anxiety. Then, even in the case of an emergency vehicle to which any other vehicles need to give way under the provision of the law, the vehicle can prevent the driver from having a sense of discomfort during driving. In addition, a higher risk level may be set for an obstacle positioned lower than the vehicle on the front passenger seat side because it is difficult for the driver in the driver's seat to perceive the obstacle. Expansion of assumed driving situations allows provision of a vehicle control apparatus configured to enable safer driving and to hinder the driver from having a sense of discomfort.

Furthermore, in the present embodiment, when the lateral control threshold value is to be changed, if the range of the lateral control threshold value is smaller than a predetermined value, the apparatus may determine that the vehicle cannot travel safely and calculate a deceleration instruction in accordance with the range of the lateral control threshold value. At this time, the apparatus urges, through the information provision section 25, the driver to decelerate the vehicle or the controller 1 controllably decelerates the vehicle. Moreover, if the speed of the vehicle is lower than an allowable speed set in accordance with the range of the control threshold value, the lateral control threshold value may be permitted to be changed. This enables the driver's sense of operation to be safely made compatible with the risk level.

Figure 7:
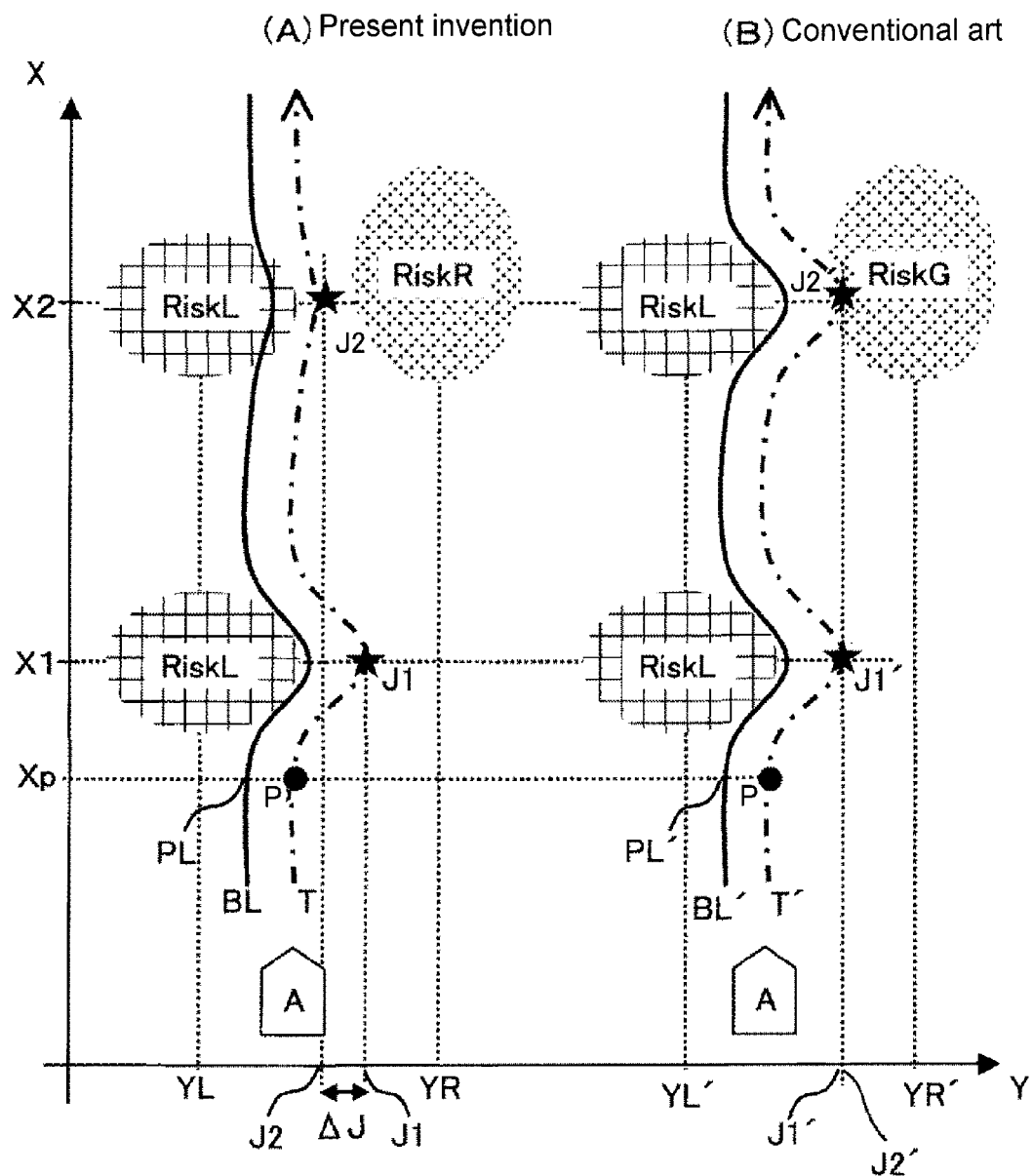
FIG. 7 A diagram showing the difference between the present embodiment and the conventional art.

FIG. 7 is a diagram showing the difference between the present embodiment and the conventional art. FIG. 7(A) shows the present embodiment, and FIG. 7(B) shows the conventional art. Here, it is assumed that a vehicle A with the vehicle control apparatus is allowed to move toward an obstacle with a left obstacle risk level RiskL to the degree that the vehicle is controlled.

Here, in FIG. 8(B), at a point X1 where there is an obstacle with the RiskL on the left of the vehicle and at a point X2 where there are an obstacle with the RiskL and an obstacle with RiskR on the respective opposite sides of the vehicle, the driving trajectories of the vehicle are as shown by J1' and J2', respectively. There appears to be almost no difference between the J1' and the J2'; in both cases, the vehicle is controllably moved to a similar position. On the other hand, in FIG. 8(A), under similar driving conditions, the driving trajectories at points X1 and X2 are as shown by J1 and J2, respectively. There is a clear difference ΔJ between the J1 and the J2. This can be achieved by a vehicle control apparatus including a calculation section configured to calculate a first risk level (RiskL in FIG. 8) present on the left of the vehicle and a second risk level (RiskR in FIG. 8) present on the right of the vehicle, a setting section configured to set a first control threshold value (PL in FIG. 8) for the left of the vehicle based on the first risk level and to set a second control threshold value for the right of the vehicle based on the second risk level, and a change section configured to change at least one of the first and second control threshold values based on the first and second risk levels (the change results in the ΔJ). This cannot be achieved by the conventional art.

Furthermore, for example, an increase in right RiskR allows the vehicle to pass closer to the obstacle with the RiskL at the point X2 (the J2 decreases). Then, an increase in ΔJ can be confirmed.

The present specification embraces the contents recited in the specification and/or drawings of Japanese Patent Laid-Open Application No. 2008-240160, on which the priority of the present application is based.

The invention claimed is:

1. A vehicle control apparatus comprising:
sensors; and
a controller that receives input from the sensors, the controller including:
a calculation section configured to calculate a first risk level present on a left of a vehicle and a second risk level present on a right of the vehicle;
a setting section configured to set a first control threshold for the left of the vehicle based on the first risk level and to set a second control threshold for the right of the vehicle based on the second risk level; and
a change section configured to change at least one of the first and second control thresholds based on the first and second risk levels, wherein
the first risk level indicates a distribution of a probability at which the vehicle collides against a first object present on the left of the vehicle,
the second risk level indicates a distribution of a probability at which the vehicle collides against a second object present on the right of the vehicle, and
the change section changes the first control threshold value such that a position indicated by the first control threshold value is closer to the first object as the second risk level increases, and changes the second control threshold value such that a position indicated by the second control threshold value is closer to the second object as the first risk level increases.

2. The vehicle control apparatus according to claim 1, further comprising a deceleration section configured to decelerate the vehicle if the first or second control threshold value is set and if a distance between the vehicle and the first object or a distance between the vehicle and the second object is equal to or smaller than a predetermined value,
wherein if the vehicle is traveling at a predetermined speed or lower, the change section changes at least one of the first and second control threshold values.

3. The vehicle control apparatus according to claim 1, further comprising an alarm section configured to alarm a driver if the first or second control threshold value is set and if a distance between the vehicle and the first object or a distance between the vehicle and the second object is equal to or smaller than a predetermined value,
wherein if the vehicle is traveling at a predetermined speed or lower, the change section changes at least one of the first and second control threshold values.

4. The vehicle control apparatus according to claim 1, further comprising a determination section configured to determine whether or not to change the second control threshold value based on the first risk level and to determine whether or not to change the first control threshold value based on the second risk level,
wherein the change section changes at least one of the first and second control threshold values based on determination made by the determination section.

5. The vehicle control apparatus according to claim 4, wherein if the vehicle exceeds the changed control threshold, a control quantity is changed from the control quantity observed before the change in the control threshold or a different actuator is used for the control.

6. The vehicle control apparatus according to claim 1, wherein if the vehicle exceeds the changed control threshold, a control quantity is changed from the control quantity observed before the change in the control threshold or a different actuator is used for the control.

* * * * *